United States Patent
O'Shea

(10) Patent No.: US 6,813,746 B1
(45) Date of Patent: Nov. 2, 2004

(54) HIERARCHICAL MASTER PAGES

(75) Inventor: Brendan L. O'Shea, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/265,662

(22) Filed: Mar. 10, 1999

(51) Int. Cl.[7] .......................... G06F 17/00; G06F 17/21; G06F 17/24
(52) U.S. Cl. ..................... 715/517; 715/501.1; 715/513
(58) Field of Search .................. 707/517, 514, 707/522, 501.1, 10, 500.1, 513; 709/218, 219; 345/853; 715/517, 513, 501.1

(56) References Cited

U.S. PATENT DOCUMENTS

| | | | | |
|---|---|---|---|---|
| 5,634,062 A | * | 5/1997 | Shimizu et al. | 715/501.1 |
| 5,860,073 A | * | 1/1999 | Ferrel et al. | 707/522 |
| 5,870,552 A | * | 2/1999 | Dozier et al. | 709/219 |
| 5,890,170 A | * | 3/1999 | Sidana | 707/501.1 |
| 5,911,145 A | * | 6/1999 | Arora et al. | 707/514 |
| 6,035,330 A | * | 3/2000 | Astiz et al. | 709/218 |
| 6,144,962 A | * | 11/2000 | Weinberg et al. | 707/10 |
| 6,148,311 A | * | 11/2000 | Wishnie et al. | 707/513 |
| 6,191,786 B1 | * | 2/2001 | Eyzaguirre et al. | 345/853 |
| 6,230,173 B1 | * | 5/2001 | Ferrel et al. | 707/513 |
| 6,336,123 B2 | * | 1/2002 | Inoue et al. | 707/500.1 |

OTHER PUBLICATIONS

Weinmann, Elaine, QuarkXPress 3.2 Visual Quickstart Guide For Macintosh, 1993 Peachpit Press, Inc., pp. 125–140.*
Blatner, David, Mastering your QuarkXPress master pages, Oct. 1998, MacWorld Communications, Inc., pp. 118–119.*
Rutledge. Lloyd et al., A framework for generating adaptable hypermedia documents, ACM International Multimedia Conferenc 1997, pp. 121–130.*

* cited by examiner

Primary Examiner—Jospeh Feild
Assistant Examiner—William L. Bashore
(74) Attorney, Agent, or Firm—Fish & Richardson P.C.

(57) ABSTRACT

A page description is stored that includes a pointer to a lower-level master page description. A pointer to a higher-level master page description is stored in the lower-level master page description. A page is drawn that is described by the page description based on page elements in the higher-level master page description and the lower-level master page description.

32 Claims, 2 Drawing Sheets

HIERARCHICAL MASTER PAGES

BACKGROUND OF THE INVENTION

In typical page layout programs, such as PageMaker or QuarkXPress, a user may define master pages. A master page includes common layout and content elements that are inherited by publication pages to which the master page is applied. More than one master page can be defined. Each publication page can inherit the common elements of a specified one of the master pages.

SUMMARY

In general, in one aspect, the invention features storing a page description that includes a pointer to a lower-level master page description; storing, in the lower-level master page description, a pointer to a higher-level master page description; drawing a page that is described by the page description based on page elements in the higher-level master page description and the lower-level master page description.

Implementations of the invention may include one or more of the following features. The page elements may be layout elements or content elements. Another page description may be stored that includes a pointer to another lower-level master page description. The other lower-level master page description may also include a pointer to the higher-level master page description. Another page that is described by the other page description may be drawn based on page elements in the higher-level master page description and in the other lower-level master page description.

A WYSIWYG user interface may be provided that enables a user to interact with representations of the pages. The page descriptions may be generated based on interaction of the user with the interface.

In general, in another aspect, the invention features storing a page description that includes pointers to two master page descriptions, and drawing a page that is described by the page description, based on page elements in both of the two master page descriptions.

In general, in another aspect, the invention features a graphical user interface in which symbols are displayed representing pages of a page description hierarchy and elements are displayed representing the hierarchical relationships of the pages in the hierarchy.

In implementations of the invention, the symbols may be thumbnails that represent master pages or publication pages in the page description hierarchy. The elements may be alphanumeric characters that are placed within the symbols.

In general, in another aspect, the invention features assigning a first master page description to a second master page description and the second master page description to a page description. A page that is drawn from the page description is based on page elements in the page description, the first master page description, and the second master page description.

Allowing master page elements to be inherited by other master page elements enables the elements that are common to multiple master pages to be defined and maintained easily in a single place (the higher level master page). The multiple level hierarchy of master pages enables elements common to different levels of publication pages to be combined on a single master page. Time is saved and maintenance errors are reduced.

Other advantages and features will become apparent from the following description and from the claims.

DETAILED DESCRIPTION

Figure 1:
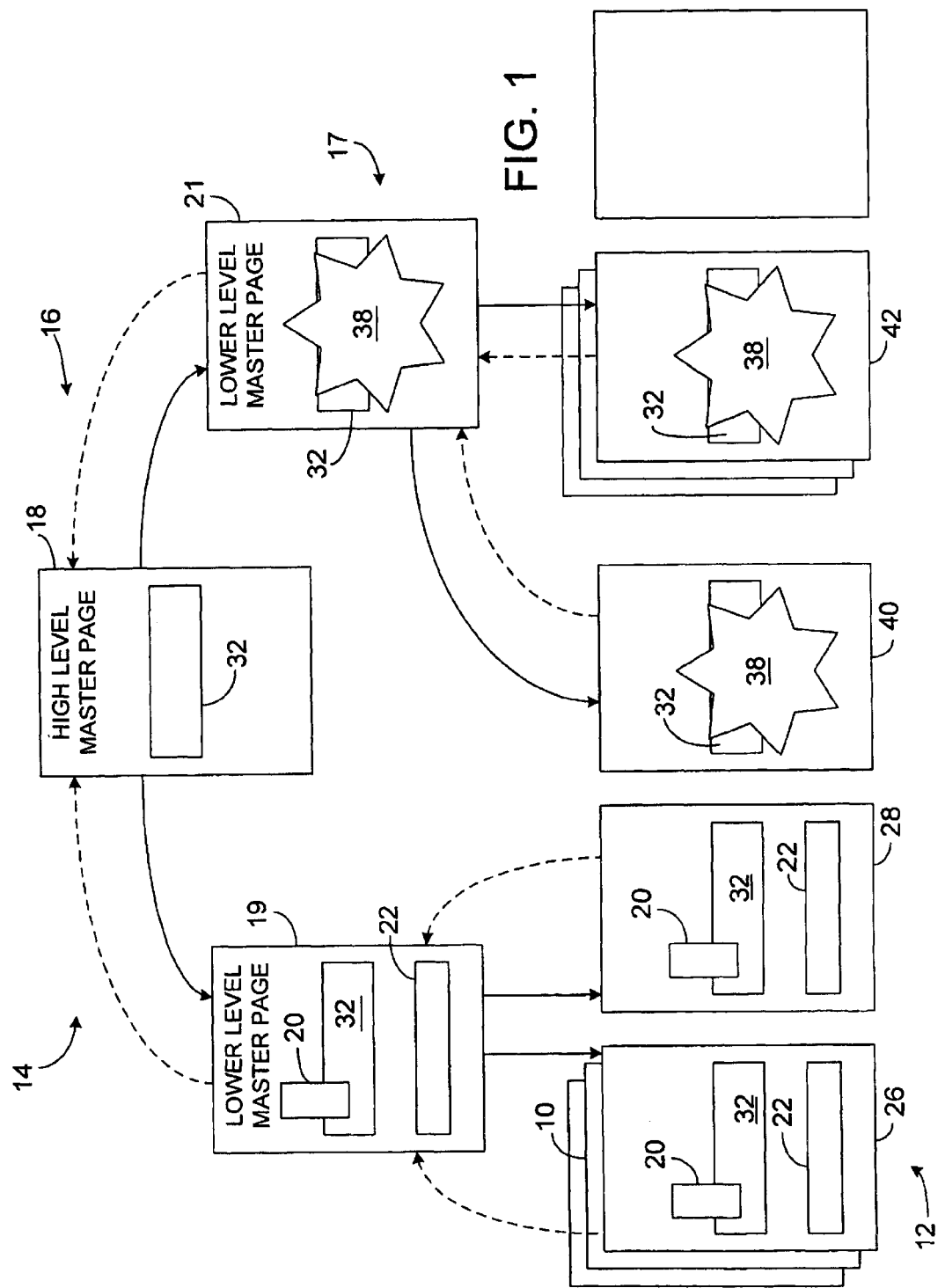
FIG. 1 is a diagram of a page description hierarchy.

As seen in FIG. 1, to enable more flexibility in defining and using layout and content elements that are shared in common in various combinations among the pages 10 of a publication 12, a page layout program enables a user to define a hierarchy 14 of levels 16, 17 of master pages 18.

Each master page includes descriptions of one or more layout elements (e.g., a placed frame) and content elements (e.g., text) that are to be inherited by one or more of the publication pages. For example, a lower level master page 19 could include an element 20 in the form of a logo and an element 22 in the form of a text footer that are both inherited by (and therefore appear in) two publication pages 26, 28.

Each lower level master page 19 may also inherit layout and content elements from a higher level master page 18 that lies at a higher level 16 in the hierarchy 14 of master pages. For example, master page 18 could include a confidential banner 32 that is inherited by master pages 19 and 21 and in turn inherited by publication pages 26, 28, 40, 42. As shown, master page 21 also includes a graphical element 38 that is inherited by publication pages 40, 42. Because a single master page 18 contains the description of the confidential banner, the banner can be maintained by changing only that master page without having to make identical changes to the two master pages 19, 21 at the next lower level of the hierarchy.

The hierarchical master page arrangement is implemented by including in the data structures of publication pages and master pages, pointers to master pages in the next higher level of the hierarchy from which they inherit elements. The pointers are indicated by the dashed, pointed lines in FIG. 1.

When each of the publication pages is drawn (i.e., rendered) for display or printing or another purpose, the master pages are drawn in a recursive manner. As the page is being drawn, any pointer to a master page is effected by drawing the master page elements. As that master page is being drawn, any pointer to a master page at the next higher level is effected by drawing the higher-level master page's elements, and so on.

The descriptions contained in the data structures that represent the master pages and the publication pages are generated from information provided by a user of the page layout program via a graphical user interface (GUI). The GUI displays what-you-see-is-what-you-get (WYSIWYG) versions of the pages. The user creates the layout and content elements on the displayed pages using tools provided by the program.

For example, the user could create a higher-level master page A. Then two lower-level master pages B and C could be created that would inherit the elements of master page A and add two different sets of elements to them. Publication pages could then be created that would include three pages that are based on master page B and two that are based on master page C.

Figure 2:
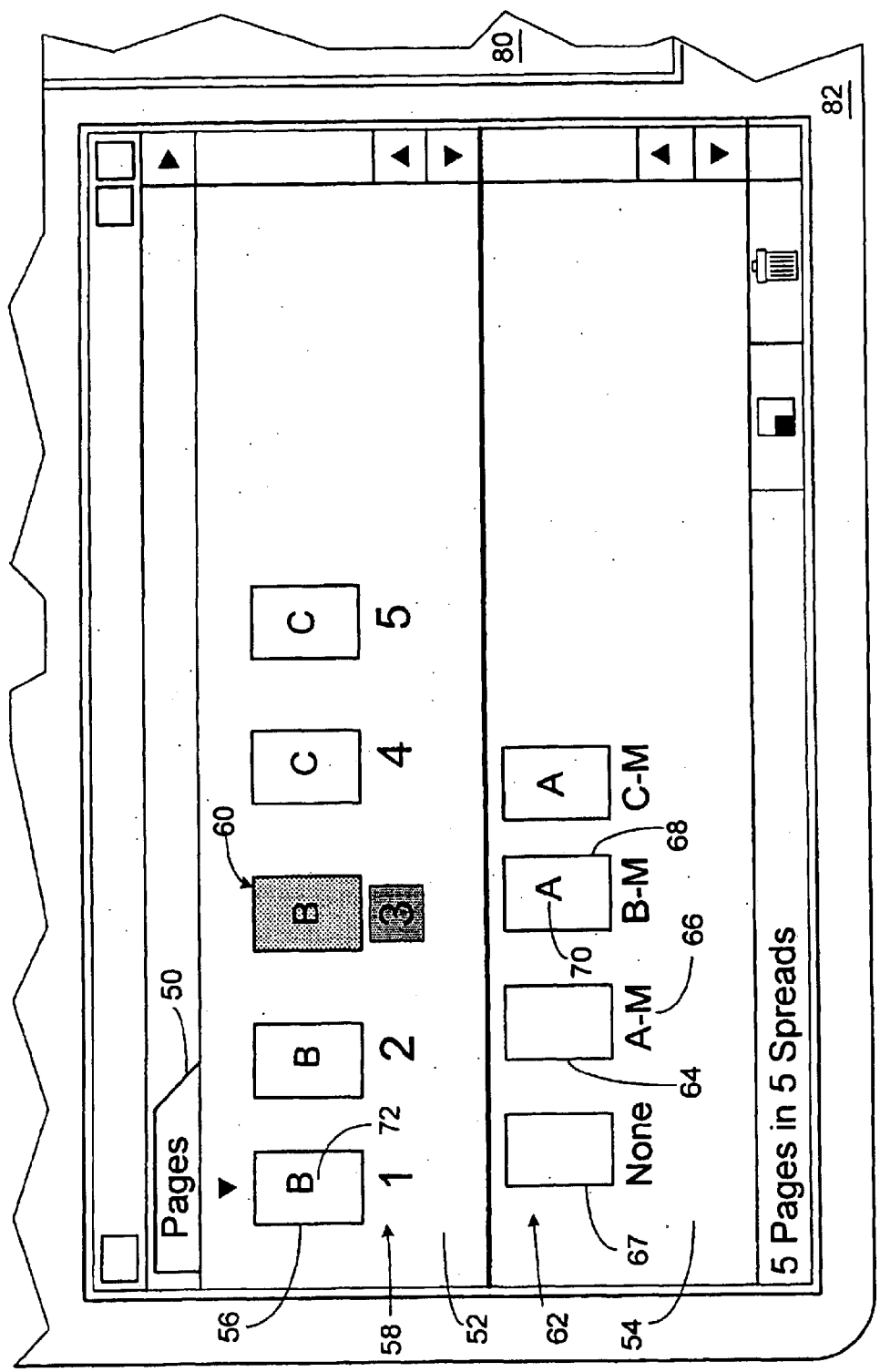
FIG. 2 is a screen shot of a palette.

As seen on FIG. 2, the hierarchical relationships of master pages and publication pages of such a publication are illustrated for the user on a pages palette 50 that is divided horizontally into two subpalettes 52, 54. Subpalette 52 displays a row of thumbnails 56 each representing one of the publication pages. The page numbers are indicated in a row 58 under the row of thumbnails. One of the thumbnails and the related page number 60 are highlighted to indicate the WYSIWYG page 80 that is displayed for editing in the main part of the display 82.

Subpalette 54 displays a row 62 of thumbnails representing master pages of the publication. Each master page thumbnail 64 has a related label 66. One master page thumbnail 67 is labelled "NONE" to indicate that its elements are not inherited by any other master page or any publication page. Some master pages 68 contain a pointer 70 that points to another master page form which elements are inherited. Both subpalettes 52, 54 may be scrolled.

Similarly each publication page thumbnail 56 contains a pointer 72 to one of the master pages. In the example of FIG. 2, publication pages 1, 2, and 3 inherit elements from master page B, and, through master page B, from master page A. Publication pages 4 and 5 inherit from master pages C and A.

Other embodiments are also within the scope of the following claims.

For example, a page could be subject to multiple inheritance from different master pages of the next higher level. In the example shown in FIG. 1, a publication page could inherit all of the elements from both master pages 19 and 21.

In addition to permitting a master page to inherit elements from other master pages it is possible to assign a master page to another master page. In that case the second master page is construed to include the elements of the first master page. Similarly, the second master page can be assigned to a publication page so that when the publication page is rendered, the rendered page includes all of the specific elements in the publication page and all of the elements in both master pages.

Also, there could be additional levels in the hierarchy shown in FIG. 1.

What is claimed is:

1. A machine-based method comprising storing a first page description that includes a reference to a lower-level master page description, storing, in the lower-level master page description, a reference to a higher-level master page description, each of the master page descriptions describing graphical page elements to be included at specified locations on a page to be printed from the first page description, the first page description and the master page descriptions being related in a hierarchy having more than two levels, the lower-level master page description inheriting graphical page elements of the higher-level master page description, and the first page description inheriting graphical page elements of both of the lower-level master page description and the higher-level master page description, and drawing a page that is described by the first page description by incorporating in the page being drawn, graphical page elements from the higher-level master page description and by incorporating graphical page elements from the lower-level master page description.

2. The method of claim 1 in which the page elements comprise layout elements.

3. The method of claim 1 in which the page elements comprise content elements.

4. The method of claim 1 further comprising storing another page description that includes a reference to another lower-level master page description, storing, in the other lower-level master page description, a reference to the higher-level master page description, and drawing another page that is described by the other page description, based on page elements in the higher-level master page description and in the other lower-level master page description.

5. The method of claim 1 further comprising providing a WYSIWYG user interface that enables a user to interact with representations of the pages, and generating the page descriptions based on interaction of the user with the interface.

6. A machine-based method comprising storing a first page description that includes references to two master page descriptions, each of the master page descriptions describing graphical page elements to be included at specified locations on a page to be printed from the first page description, one of the master page descriptions being a lower-level master page description and one of the master page descriptions being a higher-level master page description, and drawing a page that is described by the first page description by incorporating in the page being drawn, graphical page elements from both of the two master page descriptions, the lower-level master page description inheriting graphical page elements of the higher-level master page description, and the first page description inheriting graphical page elements of both of the lower-level master page description and the higher-level master page description.

7. The method of claim 6 in which the page elements comprise layout elements.

8. The method of claim 6 in which the page elements comprise content elements.

9. The method of claim 6 further comprising providing a WYSIWYG user interface that enables a user to interact with a representation of the page, and generating the page description based on interaction of the user with the interface.

10. A machine-readable file stored on a medium, the file enabling a machine to be configured to draw a page, comprising a first page description that includes a reference to a lower-level master page description, and in the lower-level master page description, a reference to a higher-level master page description, each of the master page descriptions describing graphical page elements to be included at specified locations on a page to be printed from the first page description, the first page description and the master page descriptions being related in a hierarchy having more than two levels, the lower-level master page description inheriting graphical page elements of the higher-level master page description, and the first page description inheriting graphical page elements of both of the lower-level master page description and the higher-level master page description.

11. The stored file of claim 10 in which the page elements comprise layout elements.

12. The stored file of claim 10 in which the page elements comprise content elements.

13. The stored file of claim 10, the file also enabling a machine to be configured to draw another page, comprising another page description that includes a reference to another lower-level master page description, and in the other lower-level master page description, a reference to the higher-level master page description.

14. A machine-based display method comprising, in a graphical user interface, displaying symbols representing page descriptions, each of the page descriptions describing elements to be included at specified locations on a page to be printed, the page descriptions being related in a hierarchy having more than two levels, the page descriptions including a first page description, a lower-level master page description, and a higher-level master page description, the lower-level master page description inheriting graphical page elements of the higher-level master page description, and the first page description inheriting graphical page elements from both of the lower-level and the higher-level master page descriptions, and elements representing the hierarchical relationships of the page descriptions in the hierarchy.

15. The method of claim 14 in which the symbols represent master pages in the page description hierarchy.

16. The method of claim 14 in which the symbols represent publication pages in the page description hierarchy.

17. The method of claim 14 in which the symbols comprise thumbnails.

18. The method of claim 14 in which the symbols comprise alphanumeric characters.

19. The method of claim 14 in which the elements are placed within the symbols.

20. A machine-based method comprising storing a first master page description, a second master page description, and a page description, assigning the first master page description to the second master page description and the second master page description to the page description, each of the master page descriptions describing graphical page elements to be included at specified locations on a page to be printed from the first page description, the first page description and the master page descriptions being related in a hierarchy having more than two levels, the second master page description inheriting graphical page elements from the first master page description, and the first page description inheriting graphical page elements from both of the first master page description and the second master page description, and drawing a page that is described by the page description by incorporating in the page being drawn, page elements from the page description, graphical page elements from the first master page description, and graphical page elements from the second master page description.

21. The method of claim 20 in which at least one of the elements inherited by the first page description from the second master page description comprises an element inherited by the second master page description from the first master page description.

22. A machine-based method comprising storing a first page description that includes a reference to a lower-level master page description, the first page description describing graphical elements to be included at specified locations on a page to be printed, storing, in the lower-level master page description, a reference to a higher-level master page description, each of the master page descriptions describing graphical elements to be included at specified locations on a page to be printed from the first page description, the first page description and the master page descriptions being related in a hierarchy having more than two levels, the lower-level master page description inheriting graphical elements from the higher-level master page description, the first page description inheriting graphical elements of both of the master page descriptions, and drawing a page that is described by the first page description, the page including the graphical elements of the first page description in their specified locations, the graphical elements of the lower level master page description in their specified locations, and the graphical elements of the higher-level master page description in their specified locations.

23. The method of claim 1, 6, 14, or 21 in which at least one of the elements inherited by the first page description from the lower-level master page description comprises an element inherited by the lower-level master page description from the higher-level master page description.

24. A machine-readable file stored on a medium, the file enabling a machine to be configured to display:

symbols representing page descriptions, each of the page descriptions describing elements to be included at a specified locations on a page to be printed, the page descriptions being related in a hierarchy having more than two levels, the page descriptions including a first page description, a lower-level master page description, and a higher-level master page description, the lower-level master page description inheriting graphical page elements of the higher-level master page description, and the first page description inheriting graphical page elements from both of the lower-level and the higher-level master page descriptions, and elements representing the gierarchical relationships of the page descriptions in the hierarchy.

25. The stored file of claim 24 in which the symbols represent master pages in the page description hierarchy.

26. The stored file of claim 24 in which the symbols represent publication pages in the description hierarchy.

27. The stored file of claim 24 in which the symbols comprise thumbnails.

28. The stored file of claim 24 in which the symbols comprise alphanumeric characters.

29. The stored file of claim 24 in which the elements are placed within the symbols.

30. A machine-readable file stored on a medium, the file enabling a machine to be configured to store a first master page description, a second master page description, and a page description.

assign the first master page description to the second master page description and the second master page description to the page description, each of the master page descriptions describing graphical page elements to be included at specified locations on a page to be printed from the first page description, the first page description and the master page descriptions being related in a hierarchy having more than two levels, the second master page description inheriting graphical page elements from the first master page description, and the first page description inheriting graphical page elements from both of the first master page description and the second master page description, and draw a page that is described by the page description by incorporating in the page being drawn, page elements from the page description, graphical page elements from the first master page description, and graphical page elements from the second master description.

31. A machine-readable file stored on a medium, the file enabling a machine to be configured to store a first page description that include a reference to a lower-level master page description, the first page description describing graphical elements to be included at specified locations on a page to be printed, store, the lower-level master page description, a reference to a higher-level master page description, each of the master page descriptions describing graphical elements to be included at specified locations on a page to be printed from the first page description, the first page description and the master page descriptions being related in a hierarchy having more than two levels, the lower-level master page description heriting graphical elements from the higher-level master page description, the first page description inheriting graphical elements of both of the master page descriptions, and draw a page that is described by the first page description, the page including the graphical elements of the first page description in their specified locations, the graphical elements of the lower level master page description in their specified locations, and the graphical elements of the higher-level master page description in their specified locations.

32. The machine-readable file of claim 10, 22, 28, or 29 in which at least one of the elements inherited by the first page description from the lower-level master page description comprises an element inherited by the lower-level master page description from the higher-level master page description.

* * * * *

UNITED STATES PATENT AND TRADEMARK OFFICE
CERTIFICATE OF CORRECTION

PATENT NO. : 6,813,746 B1
DATED : November 2, 2004
INVENTOR(S) : Brendan L. O'Shea It is certified that error appears in the above-identified patent and that said Letters Patent is hereby corrected as shown below:

Title page,
Item [56], References Cited, OTHER PUBLICATIONS, delete "Conferenc" and replace with -- Conference --.

Column 6,
Line 19, delete "a";
Line 31, delete "gierarchical" and replace with -- hierarchical --;
Line 36, after "the", insert -- page --;

Column 7,
Line 3, delete "include" and replace with -- includes --;
Line 7, after "store", insert -- in --.

Signed and Sealed this

First Day of February, 2005

JON W. DUDAS
*Director of the United States Patent and Trademark Office*